United States Patent Office 3,849,519
Patented Nov. 19, 1974

3,849,519
CHLOROPRENE ELASTOMER COMPOSITION
Takashi Kadowaki, Michio Dohi, and Katsuichi Yokobori, Omi-machi, Japan, assignors to Denki Kagaku Kogyo Kabushiki Kaisha, Tokyo, Japan
No Drawing. Filed Apr. 30, 1973, Ser. No. 355,344
Claims priority, application Japan, June 22, 1972, 47/62,663
Int. Cl. C08f 15/02, 15/06
U.S. Cl. 260—890                                 9 Claims

ABSTRACT OF THE DISCLOSURE

A chloroprene elastomer composition has been discovered which comprises a blend of (1) a gel polymer prepared by polymerizing chloroprene monomer or a mixture of chloroprene monomer and a comonomer in the presence of a trifunctional cross-linking monomer having the formula

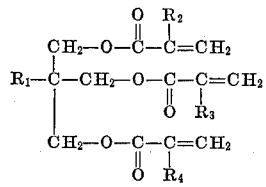

wherein $R_1$ represents a hydrogen atom, or a methyl or ethyl group; $R_2$, $R_3$ and $R_4$ respectively represent hydrogen atoms or methyl groups, or in the presence of a tetrafunctional cross-linking monomer having the formula

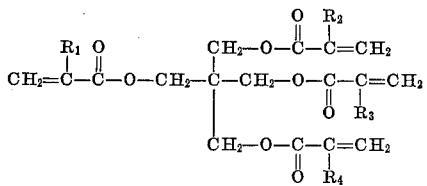

wherein $R_1$, $R_2$, $R_3$ and $R_4$ represent hydrogen atoms or methyl groups; and (2) a sol polymer prepared by polymerizing chloroprene monomer or a mixture of chloroprene and a comonomer.

BACKGROUND OF THE INVENTION

Field of the Invention

This invention relates to a chloroprene elastomer composition having excellent processability properties, especially extrusion processability properties, and the ability to set upon compression.

Description of the Prior Art

Heretofore, it has been proposed that in order to improve the extrusion processability of chloroprene, a gel polymer prepared by cross-linking a monomer having two functional groups and a sol polymer must be blended before further processing. This procedure has been disclosed in British Pat. 1,237,750.

Further, it has been expected that chloroprene polymers possessing excellent extrusion processability properties and the ability to set upon compression could be obtained by this process.

However, a need still exists for chloroprene compositions which have improved extrusion processability and the ability to set upon compression.

SUMMARY OF THE INVENTION

Accordingly, one object of this invention is to provide a chloroprene elastomer composition having superior extrusion processability and the ability to set upon compression.

Another object of this invention is to provide a process for preparing articles which have smooth surfaces without any deformation even though the article has a complicated sectional view because of its excellent flowability.

Yet another object of this invention is to provide a vulcanized article having an improved ability to set upon compression.

Briefly these objects and other objects of this invention as hereinafter will become readily apparent can be attained by providing a chloroprene elastomer composition comprising (1) a toluene insoluble gel polymer prepared by polymerizing chloroprene monomer or a mixture of chloroprene monomer and a comonomer at conversion of at least 80%, preferably greater than 90%, especially from 94–97% in the presence of 1–10%, preferably 1–7%, especially 3–7% by weight of (a) a first cross-linking monomer which contains triifunctional groups having the formula

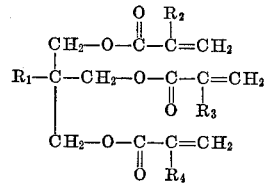

wherein $R_1$ represents hydrogen, methyl or ethyl, and $R_2$, $R_3$ and $R_4$ represent hydrogen or methyl, or (b) a second cross-linking monomer containing tetrafunctional groups having the formula

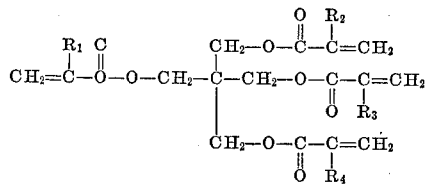

wherein $R_1$, $R_2$, $R_3$ and $R_4$ represent hydrogen or methyl; and (2) a toluene soluble sol polymer prepared by polymerizing chloroprene monomer or a mixture of chloroprene monomer and a comonomer.

DESCRIPTION OF THE PREFERRED EMBODIMENTS

The achievements of the chloroprene elastomer composition of this invention are based upon the discovery of heretofore unpredictable characteristics of the gel polymer. The gel polymer used in this invention can be prepared by polymerizing chloroprene monomer or a mixture of chloroprene monomer and a comonomer at conversions of at least 80%, preferably greater than 90%, eespecially between 94–97% in the presence of 1–10%, preferably 1–7%, especially 3–7% by weight of a cross-linking monomer based on the total monomer content in an aqueous emulsion system.

Suitable cross-linking monomers useful in the composition of this invention include trimethylolethane trimethacrylate (hereinafter referred to as TMET); trimethylolpropane trimethacrylate (hereinafter referred to as TMPT); tetramethylolmethane tetramethacrylate (hereinafter referred to as TMMT); trimethylolethane triacrylate; trimethylolpropane triacrylate; tetramethylolmethane tetraacrylate, and the like. The amount of the cross-linking monomer used in the preparation of the gel polymer ranges from 1–10%, preferably 1–7%, especially 3–7% by weight of the total monomer content of the gel polymer.

If the cross-linking monomer content is less than 1% by weight, the extrusion processability of the composition is inferior. If it is more than 10% by weight, the cross-linking index of the resulting polymer is too high for a gel polymer so that suitable physical properties can not be attained. If the conversion is less than 80%, the cross-linking index is too small, resulting in difficulty in obtaining a desirable gel polymer.

Suitable comonomers which can be copolymerized with chloroprene include styrene, butadiene, isoprene, 1-chlorobutadiene, 2,3 - dichlorobutadiene-1.3, methylvinylketone, ethyl acrylate, methyl methacrylate, acrylonitrile, methacrylonitrile, acrylic acid, methacrylic acid, and the like. It is preferable that the comonomer content of the copolymer be no more than 20% by weight of the total monomer content. The resulting gel polymer has a gel content greater than 80% by weight, preferably greater than 90%, especially greater than 94% by weight, and a swelling degree less than 20, preferably less than 10. These limitations result in a copolymer which is suitable as a gel polymer. Suitable polymerization regulators which may be added to the polymerization mixture include conventional aliphatic mercaptans such as dodecylmercaptan and the like. The amount of polymerization regulator employed is dependent upon the type of cross-linking monomer used, especially the gel content and the swelling degree thereof.

The polymerization reaction for preparing the sol polymer or the gel polymer is conducted at 5–60° C., preferably 30–50° C. The sol polymer component can be prepared by the emulsion-polymerization of chloroprene monomer or a mixture of chloroprene monomer and said comonomer in the presence of a polymerization regulator. The sol polymer which is obtained has a low molecular weight as characterized by a Mooney viscosity $ML_{1+4}$ (100° C.) of about 20.

The gel polymer component of the chloroprene composition is blended with said sol polymer component in ratios of 20–80:80–20, preferably 40–60:60–40 by weight as a latex blend, and the blended product is coagulated and dried to yield an elastomer having a Mooney viscosity $ML_{1+4}$(100° C.) of 30–70, preferably 40–60.

Having generally described the invention, a further understanding can be obtained by certain specific examples which are provided herein for purpose of illustration only and are not intended to be limiting in any manner.

In the following examples, the terms "part" and "percent" respectively designate part by weight and percent by weight.

EXAMPLES 1–7

(A) Preparation of Gel Polymer

For the preparation of the gel polymer for each Example (1–7), a 10 kg. amount of the polymerization formula shown below (see Table I for the type of cross-linking monomer used in each Example) was charged into a 30 liter reactor, and the mixture was polymerized at 40° C. under a nitrogen atmosphere.

After about a 95% conversion of the monomer to the desired copolymer was achieved, a phenothiazine and p-t-butyl catechol emulsion was added to the reactor to stop the polymerization reaction. Any unreacted monomer remaining was then removed by conventional evaporation procedures.

POLYMERIZATION FORMULA

| | Parts |
|---|---|
| Chloroprene | 95–99 |
| Cross-linking monomer (Table I) | 1–5 |
| n-Dodecylmercaptan | 0.1 |
| Water | 150 |
| Disproportionated rosin | 3.5 |
| Sodium salt of condensate of formaldehyde and naphthalenesulfonic acid | 0.8 |
| NaOH | 0.8 |
| NaHSO$_3$ | 0.5 |

(B) Preparation of Sol Polymer

For the preparation of the sol polymers for each Example (1–7) corresponding to the appropriate gel polymers above, a 10 kg. amount of the polymerization formula shown below was charged to a 30 liter reactor, and the mixture was polymerized at 40° C. under a nitrogen atmosphere.

After about a 60% conversion of chloroprene to the desired polymer was achieved, a phenothiazine and p-t-butyl catechol emulsion was added to the reactor to stop the polymerization reaction. Any unreacted monomer remaining was then removed by conventional evaporation techniques.

POLYMERIZATION FORMULA

| | Parts |
|---|---|
| Chloroprene | 100 |
| n-Dodecylmercaptan | 0.1 |
| Water | 150 |
| Disproportionated rosin | 3.5 |
| Sodium salt of condensate of formaldehyde and naphthalenesulfonic acid | 0.8 |
| NaOH | 0.8 |
| NaHSO$_3$ | 0.5 |

(C) Blend of the gel polymer with the sol polymer

The gel polymer latex and the sol polymer latex obtained by these procedures were blended in the ratio of 48:52 by weight of the gel polymer to the sol polymer. The blended product was then coagulated and dried to yield the desired chloroprene elastomer composition.

REFERENCES 8–9

The procedures of Example 1 were used except that 97 parts of chloroprene were used and TMET was replaced with ethyleneglycoldimethacrylate (hereinafter referred to as EDMA) for the preparation of the gel polymer as prepared in Example 1. The preparation of the blend of the gel polymer latex of the reference examples and the sol polymer latex was accomplished as described in Examples 1–7. The results of the preparation of the compositions of Examples 1–7 and References 8–9, and the results of the processability of each sample are shown in Table I. It is clear from the data in Table I that the compositions of this invention which contain a tri- or tetrafunctional cross-linking monomer instead of a di-functional cross-linking agent have excellent flow (extruding velocity) properties and especially good Nerve number values. The ability of the chloroprene compositions of this invention to set upon compression is also improved over the elastomer compositions containing the bifunctional cross-linking elastomer -EDMA as disclosed in British Pat. 1,237,750.

TABLE 1

| Experiments | | Example | | | | | | | Reference | |
|---|---|---|---|---|---|---|---|---|---|---|
| | | 1 | 2 | 3 | 4 | 5 | 6 | 7 | 8 | 9 |
| Gel polymer | Cross-linking monomer | TMET [1] | | | TMPT [2] | | | TMMT [3] | | EDMA [4] |
| | Chloroprene (part) | 99 | 97 | 95 | 99 | 97 | 95 | 97 | 97 | 95 |
| | Amount of cross-linking monomer (part) | 1 | 3 | 5 | 1 | 3 | 5 | 3 | 3 | 5 |
| | Conversion (percent) | 96 | 94 | 94 | 95 | 97 | 94 | 94 | 94 | 95 |
| | Gel content (percent) [5] | 94 | 95 | 97 | 95 | 96 | 96 | 97 | 95 | 96 |
| | Swelling degree [6] | 7.3 | 5.4 | 4.6 | 8.0 | 5.4 | 4.5 | 5.5 | 7.1 | 5.2 |
| Sol polymer | Mooney viscosity $ML_{1+4}$ (100° C.) | 19 | 26 | 28 | 16 | 23 | 26 | 24 | 22 | 25 |
| Blend polymer | Blending ratio of gel/sol | 48/52 | 48/52 | 48/52 | 48/52 | 48/52 | 48/52 | 48/52 | 48/52 | 48/52 |
| | Mooney viscosity $ML_{1+4}$ (100° C.) | 54 | 55 | 49 | 54 | 51 | 48 | 48 | 51 | 54 |

| | Temperature load | Load, kg. | Example | | | | | | | Reference | |
|---|---|---|---|---|---|---|---|---|---|---|---|
| | | | 1 | 2 | 3 | 4 | 5 | 6 | 7 | 8 | 9 |
| Compound: [6] | | | | | | | | | | | |
| Extrusion rate [7] (cc./sec.)×10⁻³ | 50° C | 30 | 0.12 | 0.23 | 0.38 | 0.14 | 0.23 | 0.41 | 0.35 | 0.40 | 0.18 |
| | 50° C | 60 | 0.81 | 2.00 | 2.68 | 1.04 | 3.03 | 2.95 | 1.70 | 2.72 | 0.52 |
| | 70° C | 30 | 0.39 | 0.82 | 1.35 | 0.67 | 1.63 | 1.39 | 1.33 | 1.04 | 1.16 |
| | 70° C | 60 | 4.52 | 8.98 | 13.46 | 4.96 | 6.60 | 10.38 | 8.68 | 6.60 | 9.20 |
| | 100° C | 30 | 1.70 | 4.76 | 5.50 | 2.80 | 3.66 | 5.82 | 3.40 | 3.64 | |
| Die swell [8] | 50° C | 30 | 1.25 | 1.25 | 1.25 | 1.20 | 1.25 | 1.25 | 1.25 | 1.30 | (*) |
| | 50° C | 60 | 1.30 | 1.40 | 1.40 | 1.40 | 1.40 | 1.40 | 1.50 | 1.50 | (*) |
| | 70° C | 30 | 1.25 | 1.20 | 1.20 | 1.20 | 1.20 | 1.20 | 1.30 | 1.40 | 1.30 |
| | 70° C | 60 | 1.30 | (*) | (*) | 1.30 | 1.30 | 1.30 | 1.30 | (*) | (*) |
| | 100° C | 30 | 1.20 | 1.20 | 1.20 | 1.20 | 1.20 | 1.20 | 1.25 | 1.40 | |
| Nerve number [9] | | | 1.12 | 0.97 | 0.82 | 1.20 | 1.00 | 0.85 | 0.99 | 1.17 | 0.92 |
| Vulcanized rubber: [10] Compression set [11] (percent) | | | 13.2 | 13.9 | 13.3 | 14.4 | 14.4 | 12.4 | 22.6 | 29.1 | 31.0 |

*A spiral was formed on the surface and measurements could not be made.
[1] TMET=Trimethylolethane trimethacrylate.
[2] TMPT=Trimethylolpropane trimethacrylate.
[3] TMMT=Tetramethylolmethane tetramethacrylate.
[4] EDMA=Ethyleneglycol dimethacrylate.
[5] The gel content and the swelling degree were measured as follows. A 0.5 g. sample of polymer having the size of a grain of rice was accurately measured as $W_0$, was dissolved in 100 ml. of toluene and was kept over one night at room temperature. Then, the gel component was filtered through a 200 mesh sieve and was washed with toluene. The wet gel was measured as $W_1$. The wet gel was completely dried at 100° C. and measured as a dried gel weight $W_2$.

$$\text{Gel content} = \frac{W_2 \times 100\%}{W_0 \times 100\%}$$

$$\text{Swelling degree} = \frac{W_1 \times W_2}{W_2}$$

[6] The formula of the compound was as follows:

| | Parts |
|---|---|
| Elastomer | 100 |
| Phenyl -α- naphthylamine | 1 |
| Magnesium oxide | 4 |
| Zinc oxide | 5 |
| 2-mercaptoimidazoline | 0.35 |

[7] The extrusion rate was measured as follows. The flow tester had a die of 1.0 mm diameter x 1.0 mm. The weights of the loads and the extrusion temperatures are as shown in Table I.
[8] The die swell of the extruded products obtained under the conditions shown in item (7), was measured based on the ratio of the average outer diameter of the extruded product to the diameter of the die.
[9] After the compound passed between rolls having a gap of 1.4 mm. at 30° C. 10 times, the compound was compressed into a sheet by extrusion from the rolls having a gap of 0.5 mm. The extruded sheet was kept at 25° C. for 20 minutes, and then a piece was cut having a size of 5 x 10 cm. The weight of the sheet was measured, and the Nerve number was calculated by the following equation:

$$\text{Nerve number} = \frac{\text{Measured weight} - 2.5 \times \text{specific gravity of compound}}{2.5 \times \text{specific gravity of compound}}$$

[10] Vulcanization was conducted at 141° C. for 25 minutes.
[11] The ability to set upon compression was measured by the ASTM method D-395-69 at 70° C. for 22 hours.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A chloroprene elastomer composition which comprises a blend of (1) 20–80 parts by weight of a gel polymer prepared by polymerizing chloroprene monomer or a mixture of chloroprene monomer and no more than 20% of a comonomer in the presence of 1–10 wt. percent of a trifunctional cross-linking monomer based on the total monomer content of said gel polymer having the formula

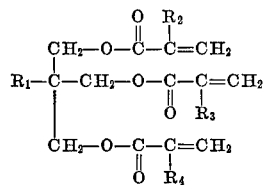

wherein $R_1$ represents a hydrogen atom, or a methyl or ethyl group; $R_2$, $R_3$ and $R_4$ respectively represent hydrogen atoms or methyl groups, or in the presence of 1–10 wt. percent of a tetrafunctional cross-linking monomer based on the total monomer content of said gel polymer having the formula

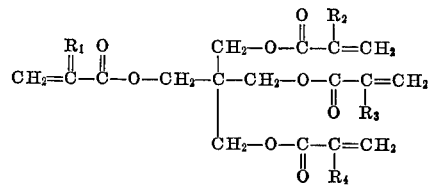

wherein $R_1$, $R_2$, $R_3$ and $R_4$ represent hydrogen atoms or methyl groups; and (2) 80–20 parts by weight of a sol prepared by polymerizing chloroprene monomer or a mixture of chloroprene and no more than 20% of a comonomer.

2. The chloroprene elastomer composition according to Claim 1, wherein said gel polymer has a swelling degree less than 20.

3. The chloroprene elastomer composition according to Claim 1, wherein said trifunctional cross-linking monomer is trimethylolethane trimethacrylate.

4. The chloroprene elastomer composition according to Claim 1, wherein said trifunctional cross-linking monomer is trimethylolpropane trimethacrylate.

5. The chloroprene elastomer composition according to Claim 1, wherein said trifunctional cross-linking monomer is tetramethylolmethane tetramethacrylate.

6. A process for preparing a chloroprene elastomer composition which comprises blending (1) 20–80 parts by weight of a gel polymer prepared by polymerizing chloroprene monomer or a mixture of chloroprene monomer and no more than 20% of a comonomer in the presence of 1-10% by weight of a trifunctional cross-linking monomer having the formula

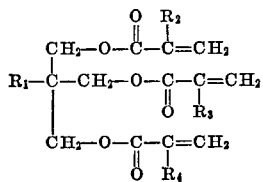

wherein $R_1$ represents a hydrogen atom, or a methyl or ethyl group and $R_2$, $R_3$ and $R_4$ represent hydrogen atoms or methyl groups; or a tetrafunctional cross-linking monomer having the formula

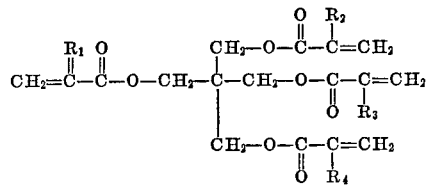

wherein $R_1$, $R_2$, $R_3$ and $R_4$ represent hydrogen atoms or methyl groups until an 80% conversion of the monomer to polymer product is obtained; and (2) 80-20 parts by weight of a sol polymer prepared by polymerizing chloroprene or a mixture of chloroprene and no more than 20% of a comonomer.

7. The process for preparing a chloroprene elastomer composition according to Claim 6 wherein said trifunctional cross-linking monomer is trimethylolethane trimethacrylate.

8. The process for preparing a chloroprene elastomer composition according to Claim 6 wherein said trifunctional cross-linking monomer is trimethylolpropane trimethacrylate.

9. The process for preparing a chloroprene elastomer according to Claim 6, wherein said trifunctional cross-linking monomer is tetramethylolmethane tetramethacrylate.

References Cited
UNITED STATES PATENTS

| | | | |
|---|---|---|---|
| 2,628,210 | 2/1953 | Etchason et al. | 260—86.3 |
| 3,655,827 | 4/1972 | Finlay et al. | 260—890 |
| 3,714,296 | 1/1973 | Kitagawa et al. | 260—890 |
| 3,719,649 | 3/1973 | Jennes et al. | 260—890 |
| 3,752,785 | 8/1973 | Smith | 260—890 |

HARRY WONG, JR., Primary Examiner

U.S. Cl. X.R.

260—29.7 D, 63 BB, 80.81, 82.1, 85.5 XA, 86.3, 87.5 R